United States Patent
Helbert

(10) Patent No.: US 9,648,530 B2
(45) Date of Patent: May 9, 2017

(54) METHOD FOR WIFI CONNECTIVITY LOSS ANTICIPATION

(71) Applicant: Alcatel Lucent, Boulogne Billancourt (FR)

(72) Inventor: Emmanuel Helbert, Illkirch (FR)

(73) Assignee: Alcatel Lucent, Boulogne-Billancourt (FR)

( * ) Notice: Subject to any disclaimer, the term of this patent is extended or adjusted under 35 U.S.C. 154(b) by 47 days.

(21) Appl. No.: 14/651,822

(22) PCT Filed: Nov. 26, 2013

(86) PCT No.: PCT/EP2013/074681
§ 371 (c)(1),
(2) Date: Jun. 12, 2015

(87) PCT Pub. No.: WO2014/090564
PCT Pub. Date: Jun. 19, 2014

(65) Prior Publication Data
US 2015/0319660 A1 Nov. 5, 2015

(30) Foreign Application Priority Data

Dec. 14, 2012 (EP) .................................... 12306590

(51) Int. Cl.
*H04W 36/14* (2009.01)
*H04W 36/30* (2009.01)
(Continued)

(52) U.S. Cl.
CPC ........... *H04W 36/14* (2013.01); *H04W 4/008* (2013.01); *H04W 36/245* (2013.01);
(Continued)

(58) Field of Classification Search
CPC ... H04W 36/14; H04W 4/008; H04W 76/021; H04W 36/245; H04W 36/30; H04W 36/32
(Continued)

(56) References Cited

U.S. PATENT DOCUMENTS 6,385,454 B1 5/2002 Bahl et al.
2005/0255856 A1 11/2005 Griffin et al.
(Continued)

FOREIGN PATENT DOCUMENTS

WO    WO 01/58182 A2    8/2001

OTHER PUBLICATIONS

International Search Report for PCT/EP2013/074681 dated Jan. 15, 2014.

*Primary Examiner* — Marisol Figueroa
(74) *Attorney, Agent, or Firm* — Fay Sharpe, LLP

(57) ABSTRACT

A method for anticipating the loss of connectivity between a mobile device and a wireless short-range access point among a plurality of such wireless access points, this method comprising the following steps: —collecting a plurality of paths corresponding to the mobile device movements within the coverage areas of the access points to which the mobile device was successively associated without loss of connectivity, each path comprising a root access point at which a connectivity is originated and a dead-end access point at which the connectivity is lost; —detecting the current access point to which the mobile device is currently associated; —identifying the paths comprising the current access point; —computing the risks of losing the connectivity when following each of the identified paths from the current access point to the root access point or to the dead-end access point of each of the identified paths.

11 Claims, 2 Drawing Sheets

(51) Int. Cl.
*H04W 4/00* (2009.01)
*H04W 76/02* (2009.01)
*H04W 36/24* (2009.01)
*H04W 36/32* (2009.01)
*H04W 88/08* (2009.01)
*H04W 84/12* (2009.01)

(52) U.S. Cl.
CPC ........... *H04W 36/30* (2013.01); *H04W 36/32* (2013.01); *H04W 76/021* (2013.01); *H04W 84/12* (2013.01); *H04W 88/08* (2013.01)

(58) Field of Classification Search
USPC .................................................. 455/436–444
See application file for complete search history.

(56) References Cited

U.S. PATENT DOCUMENTS

| | | | |
|---|---|---|---|
| 2009/0156210 A1 | 6/2009 | Ponce De Leon et al. | |
| 2013/0090115 A1* | 4/2013 | Deivasigamani | H04W 48/20 455/434 |
| 2014/0250533 A1* | 9/2014 | Basavapatna | H04W 4/02 726/25 |
| 2015/0189556 A1* | 7/2015 | Sidhu | H04W 36/0083 455/436 |

* cited by examiner

METHOD FOR WIFI CONNECTIVITY LOSS ANTICIPATION

FIELD OF THE INVENTION

The present invention relates to short Wireless Local Area Network (WLAN) connectivity.

BACKGROUND OF THE INVENTION

WiFi (for Wireless Fidelity also referred to as IEEE 802.11) is now fully integrated in the communication landscape and is becoming the dominant Wireless Local Area Networking (WLAN) standard. Developed in different versions (i.e. 802.11a/b/g/n) offering coverage up to hundreds of meters with a theoretical throughput up to about 50 Mbps, WiFi networks are widely deployed by means of numerous WiFi Access Points (AP) scattered across different environments including business, public and residential environments.

While roaming within the range of a WiFi access point, a mobile device equipped with a WiFi interface may remain constantly connected, through this access point, to wide-area networks (such as Internet or Intranet) for different communication services including delay-constrained ones (such as voice-over-IP, IPTV, or streaming).

However, as soon as the mobile device leaves the coverage of this WiFi access point, an interruption occurs, causing the loss of the WiFi network connection. Therefore, handover techniques for maintaining seamless connections during mobility are proposed so that, while moving, WiFi users do not experience substantial interruption in their ongoing communications via WiFi access points.

Nevertheless, although different solutions have been proposed to improve the handover process between WiFi access points, the handover triggering is often based on radio strength measurements (such as Signal to Interference and Noise Ratio SINR, or Received Signal Strength RSS). In fact, when the radio strength level becomes lower than a predefined threshold, the mobile station may either roam to another WiFi access point or switch the current WiFi connection(s) to another network offering a better connectivity (LTE for instance).

Such solutions lack robustness because radio strength measurements are not precise enough and generally depend on hardware platform. Moreover, radio strength level may decline quickly due to attenuation and fading (notably, because of multi-path propagation) with the risk for the mobile station to not having enough time to move current WiFi connection(s) on another radio network without interruption thereof.

One object of the present invention is to propose a method and algorithm to anticipate WiFi connectivity loss between a mobile station and a WiFi infrastructure in order to make all necessary actions to save or move existing network streams to another network that proposes a better connectivity.

Another object of the present invention is to provide a method for intra-WiFi access points handover for a seamless mobility.

Another object of the present invention is to provide an efficient trigger for intra-WiFi handover.

Another object of the present invention is to propose a metric for intra-WiFi access points handover that provides gains in term of delays and system overall throughput.

SUMMARY OF THE INVENTION

Various embodiments are directed to addressing the effects of one or more of the problems set forth above. The following presents a simplified summary of embodiments in order to provide a basic understanding of some aspects of the various embodiments. This summary is not an exhaustive overview of these various embodiments. It is not intended to identify key of critical elements or to delineate the scope of these various embodiments. Its sole purpose is to present some concepts in a simplified form as a prelude to the more detailed description that is discussed later.

Various embodiments relate to methods for anticipating the loss of connectivity between a mobile device and a wireless short-range access point among a plurality of such wireless access points, said methods comprising the following steps:

collecting the identifiers of access points to which the mobile device was successively associated without loss of connectivity and the duration of each of these associations so that reproducing a plurality of paths corresponding to the mobile device movements within the coverage areas of the said access points to which the said mobile device was successively associated without loss of connectivity, each path comprising a root access point at which a connectivity is originated and a dead-end access point at which the said connectivity is lost;

detecting the current access point to which the mobile device is currently associated;

identifying the paths comprising the said current access point;

computing the risks of losing the connectivity when following each of the said identified paths from the said current access point to the root access point or to the dead-end access point of each of the said identified paths, the risk of losing connectivity when following a path from a first access point to a second access point being the inverse of the sum of the collected durations of association corresponding to the access points comprised in the said path from the said first access point to the said second access point.

In accordance with a broad aspect, the above methods further comprise an identification step of at least an application in the mobile device using the connectivity provided by the access point to which the said mobile device is currently associated;

a determining step of a threshold value above which, for the identified application, the connectivity is considered lost;

when a computed risk is greater than the determined threshold value, a triggering step of a handover of the identified application.

In accordance with another broad aspect, the threshold value is the time required to handover the connection used by the identified application to another wireless short-range access point.

In accordance with another broad aspect, the threshold value is the time required to handover the connection used by the identified application to a long-range communication network.

Various embodiments relate to systems for anticipating the loss of connectivity between a mobile device and a wireless short-range access point among a plurality of such wireless access points, said system comprising:

means for collecting the identifiers of access points to which the mobile device was successively associated without loss of connectivity and the duration of each of these associations so that reproducing a plurality of paths corresponding to the mobile device movements within the coverage areas of the said access points to which the said mobile device was successively associated without loss of connectivity, each path comprising a root access point at which a connectivity is originated and a dead-end access point at which the said connectivity is lost;

means for detecting the current access point to which the mobile device is currently associated;

means for identifying the paths comprising the said current access point;

means for computing the risks of losing the connectivity when following each of the said identified paths from the said current access point to the root access point or to the dead-end access point of each of the said identified paths, the risk of losing connectivity when following a path from a first access point to a second access point being the inverse of the sum of the collected durations of association corresponding to the access points comprised in the said path from the said first access point to the said second access point;

In accordance with a broad aspect, the above systems furthers include means for identifying at least an application in the mobile device using the connectivity provided by the access point to which the said mobile device is currently associated;

means for determining a threshold value above which, for the identified application, the connectivity is considered lost;

when a computed risk is greater than the determined threshold value, means for triggering a handover of the identified application.

In accordance with another broad aspect, the paths are obtained from a site map.

In accordance with another broad aspect, the wireless short-range access point is a WiFi access point.

Various embodiments further relate to a computer program product for performing the above methods.

While the various embodiments are susceptible to various modification and alternative forms, specific embodiments thereof have been shown by way of example in the drawings. It should be understood, however, that the description herein of specific embodiments is not intended to limit the various embodiments to the particular forms disclosed.

It may of course be appreciated that in the development of any such actual embodiments, implementation-specific decisions should be made to achieve the developer's specific goal, such as compliance with system-related and business-related constraints. It will be appreciated that such a development effort might be time consuming but may nevertheless be a routine understanding for those or ordinary skill in the art having the benefit of this disclosure.

BRIEF DESCRIPTION OF THE DRAWINGS

The objects, advantages and other features of the present invention will become more apparent from the following disclosure and claims. The following non-restrictive description of preferred embodiments is given for the purpose of exemplification only with reference to the accompanying drawing in which

DETAILED DESCRIPTION OF ILLUSTRATIVE EMBODIMENTS

Figure 1:
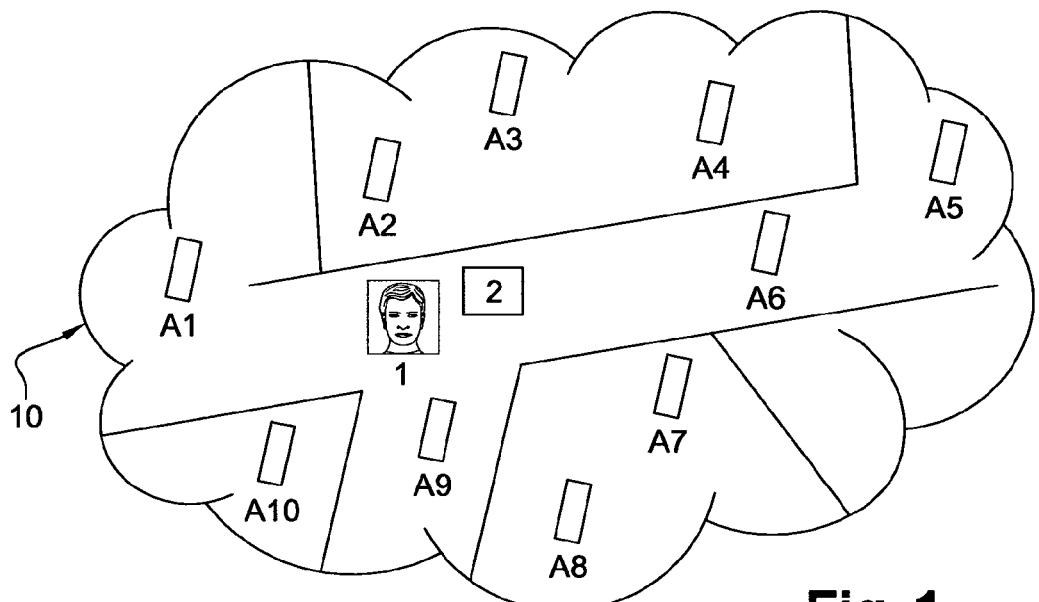
FIG. 1 is a schematic diagram illustrating an environment for deploying various embodiments.

With reference to FIG. 1, there is shown a plurality of WiFi access points A1-A10 deployed in an environment 10. These WiFi access points A1-A10 may be any access nodes for residential or business local area and/or public or commercial hotspots connectivity.

As illustrative examples of the environment 10, one can mention a company, a university, a hotel, an airport, a shopping mall, a downtown location, a pedestrian street, a cultural center, a district, or more generally any area or building that may be covered, at least partially, by a plurality of WiFi access points A1-A10.

A user 1 provided with a WiFi capable mobile device 2 may benefit, in the environment 10, from different communication services including both disconnection-tolerant and disconnection-sensitive applications such as video streaming, Instant messaging, Web browsing, ftp, messaging (Mail), MMoIP (Multimedia over IP such as voice, data and video), uploading/downloading files.

By "mobile device" is meant here any user equipment provided with a WiFi interface and a WiFi connectivity manager permitting to automatically connect this user equipment, through the WiFi interface, to a WiFi access point A1-A10. A laptop computer, a smartphone, a mobile telephone, or a Personal Digital Assistant (PDA) are examples of such mobile device 2.

When the user 1 moves in the environment 10 while maintaining at least an active connection through the WiFi access points A1-A10, this connection is handed off between the WiFi access points A1-A10 that the user 1 moves through their respective coverage areas. It results in that, while moving in the environment 10, a "path" corresponding to the user movement within the coverage area of the WiFi access points A1-A10 is built of nodes representing the WiFi access points to which the user has been associated (i.e. has connected thereto). These paths cross each over at crossroad nodes.

For example, if the user 1 moves successively close to the WiFi access points A10, A9, A7, A6 and through which he/she had, respectively, maintained a Web browsing service (or simply having an established WiFi connectivity without necessarily being used by an application), then a path A10-A9-A7-A6 corresponding to the user movement in the environment 10 is built. These access points A10, A9, A7, A6 may be manually of automatically selected for the connection.

The term "move" is to be understood broadly to include any change, whatever continuous or discrete in time, in location of the user 1 in the environment 10 such as "walking from the railway station to the office, working in the office, going for lunch in a restaurant close to the office, take the elevator to the third floor, going back to the railway station".

It is to be noted that, some of the WiFi access points A1-A10 may be situated next to a coverage hole or at the border of the environment 10 (such as next to the entrance/exit of the environment 10) so that they correspond to "dead-end" access points in paths that a user can follow within the environment 10. Whereas, other access points A1-A10 correspond to "safe places" (from a connectivity point of view) where it has been detected that the user 1 stays long times with no risk of WiFi connectivity loss (such as, at home or in office).

Accordingly, the identifiers of access points A1-A10 to which the mobile device 2 was successively associated without loss of connectivity and the duration of each of these associations are collected so that reproducing a plurality of paths corresponding to the mobile device 2 movements within the coverage areas of the access points A1-A10 to which the mobile device 2 was successively associated without loss of connectivity, each path comprising a root access point at which a connectivity is originated and a dead-end access point at which this connectivity is lost. Thus, paths followed by the user 1 within the environment 10 and the durations of association of the mobile device 2 to each of the nodes (i.e. access points) of these paths are collected and registered.

The topology of the previously followed paths (i.e. collected paths) by the user 1 in the environment 10 may be
- either automatically and progressively built and stored by the WiFi connectivity manager that detects WiFi access point A1-A10 connection;
- downloaded from a server; or even
- configured manually by the user.

Advantageously, if the paths topology is automatically built by the mobile device 2, these paths are consistent with the mobile device radio performance and to the user movements.

Further, while the user is moving in the environment 10, the WiFi connectivity manager is configured to continually or intermittently examines the paths followed by the user 1 and the type of ongoing network streams used by the applications running on the mobile device 2 so as to decide whether to trigger a handover procedure, toward another WiFi access point A1-A10 (or, alternatively, toward another radio access networks such as 3G or 4G wireless networks), before starting the loss of at least an ongoing network stream.

Then, at each node of a current path (in other words, at each WiFi access point A1-A10 to which the mobile device 2 is currently associated, this WiFi access point may be the first, an intermediate, or the last node of an ongoing path), the WiFi connectivity manager is configured to update the paths if a new WiFi access point A1-A10 is detected or to estimates the path that has the best probability to be followed.

To that end, the current access point to which the mobile device 2 is currently associated is detected and the paths that comprise the current access point are identified from the collected ones. Then, the risks of losing the connectivity when following each of the identified paths from the current access point to the root access point or to the dead-end access point of each of the identified paths, are computed. The risk of losing connectivity when following a path from a first access point to a second access point is the inverse of the sum of the collected durations of association corresponding to the access points comprised in this path from the first access point to the second access point.

In other words, at each node of the current path being followed by the user 1 while moving in the environment 10, the WiFi connectivity manager calculates a risk of the current connectivity to be lost. This risk depends on the delay necessary to go from the current WiFi access point to which the mobile device 2 is associated to the root WiFi access point or the dead-end WiFi access points of each collected path comprising the current WiFi access node (i.e. the last and first WiFi access points in previously followed path by the user 1 where a connectivity is originated or a connectivity loss is occurred). This delay, given by the sum of association durations, may be calculated based on the distance between the WiFi access points (i.e. the nodes) in the path divided by the user moving speed which could be evaluated with RSSI variation. Moreover, this delay may be calculated using means of delays measured during previous paths. For example, the delay necessary to go from the access point A1 to the access point A2 may be the arithmetic mean of
- the delay to go from the access point A1 to the access point A2; and
- the delay to go from the access point A2 to the access point A1 (i.e. the reverse path).

The risk is a dynamic value which estimates the probability to lose an established WiFi connection between the mobile device 2 and a WiFi access point A1-A10. This risk is calculated for each current path and depends on the current user location and speed. The value is dynamic and is calculated at each new WiFi access point association.

In one embodiment, the computed instantaneous risk is weighted by predefined external parameters which may depend on the hour in the day, the day in the week (for example, public holiday or not).

After each calculation, the risk of each path, from the current user location and speed, is compared to a threshold value. If the risk becomes greater or equal to this threshold, a handover of ongoing network stream(s) is to be triggered. This threshold is dynamic and depends on the applications currently utilizing the WiFi connection. This threshold is calculated based on the time necessary to handle properly these applications in case of connectivity loss and the influence of connectivity loss on these applications (i.e. whether WiFi disconnection-tolerant application or not).

In one embodiment, if no real time communication application is running, the threshold is infinite. This is the case, for instance, of browsing applications. Whereas, if the applications which are running are real time applications such as voice or video communication, this threshold may correspond to the time necessary to transfer the session over another radio connection if available (such as a data cellular network) or to end properly the sessions (redirection over a voice/video messaging system for instance).

If the applications which are running are not deeply impacted by the temporary network connectivity loss, the threshold could be estimated as the delay necessary to re-establish the session plus the delay during which the user accepts that the service is unavailable. For instance, the threshold for "Instant Messaging" application could be a tenth of seconds.

When the calculated risk becomes greater than a threshold, the WiFi connectivity manager anticipates WiFi connectivity loss by taking adequate decisions. These decisions could be:
- warn the user;
- trigger an handover procedure: switch current media-streams on another and safer radio connectivity so that they will not be lost;
- stop, postpone or hibernate applications which could be damaged by this connectivity loss.

Accordingly, a current value of the threshold is estimated by detecting the active applications and their ongoing network streams to which the corresponding current threshold value is to be applied. For each active application or for each ongoing network stream (an application may have more than one network stream such as an Instant Messaging application: text, audio and video), the threshold corresponds to the inverse of the handover delay which would impair the application. For example, if the handover of Web browsing service between a WiFi access point and a cellular network lasts less than 5 seconds (D_browsing_Handover=5), then the threshold would be T_browsing=⅕. More generally, one can have:

D_MMoIP_Handover=1 second, then the threshold for Multimedia over IP applications T_MMoIP is equal to 1;

D_video_Streaming_Handover=2 seconds, then the threshold for video streaming application T_video-_Streaming is equal to 0.5. This value may depend on the buffer length;

D_chat_Handover=5 seconds, then the threshold for chat applications T_chat is equal to 0.2;

D_mail_Handover=10 seconds, then the threshold for mail applications T_mail is equal to 0.1.

In one embodiment, the application thresholds are computed based on default values and/or on measurements made during real handovers. The default values correspond to general user experience.

Figure 2:
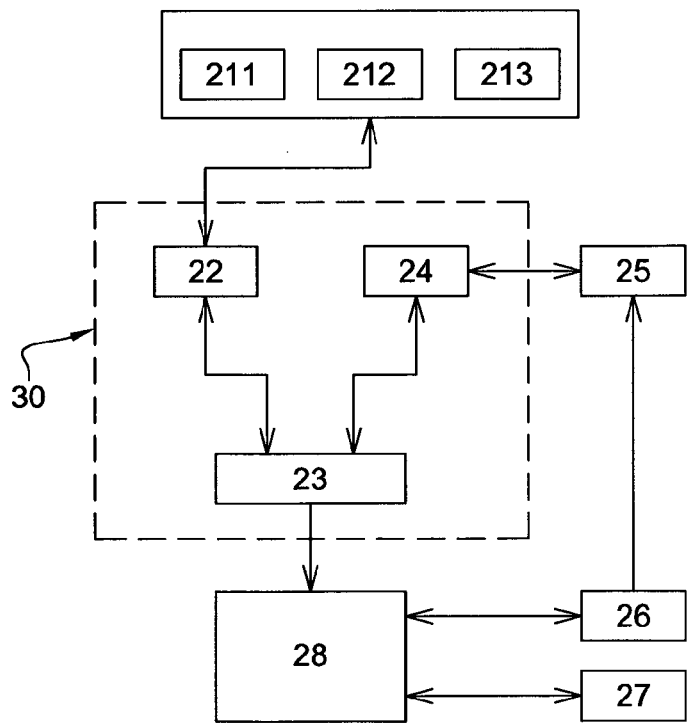
FIG. 2 is a schematic diagram illustrating functional components for handover triggering according to various embodiment.

FIG. 2 depicts an illustrative embodiment of the WiFi connectivity manager 30. In fact, the WiFi connectivity manager 30 is configured to anticipate the WiFi connectivity loss and subsequently trigger the handover toward another WiFi access point or another communication network. To that end, the WiFi connectivity manager 30 comprises a threshold estimator 22 in charge of estimating a threshold above which a handover should be triggered, threshold calculation being based on current active streams. The detection of these active streams may be done at network level identifying active socket, or at the mobile device level by means of an API used by the applications to indicate active streams. Alternatively, the threshold estimator uses the mobile device OS framework facility to detect active streams, or uses QoS marker in streams to identify their real-time dependency and accordingly determines corresponding threshold values;

a risk calculator 24 in charge to calculate in real time the risk of losing the WiFi connectivity;

a handover decision maker 23 configured to compare the calculated risk to the currently estimated threshold, and subsequently take the adequate decision. Once the computed risk is greater than the estimated threshold, the handover decision maker 23 trigger the handover management module 28 for executing the handover toward a WiFi access point via the WiFi layer 26 or toward a cellular mobile communication network via the cellular PHY/MAC layer 27;

a path detector 25 in charge of collecting and detecting, through the WiFi layers 26, the paths that the user is following.

Of course, the above described WiFi connectivity manager 30 may include others interfaces with different modules of the mobile device.

In one embodiment, the path detector 25 is fed with paths provided by the user and/or downloaded from site maps.

In one embodiment, the threshold estimator 22 embeds an API (Application programming Interface) to detect ongoing network streams (such as an uploading/downloading, a web browsing, or a video streaming) via the WiFi connectivity. Then, a threshold value per active application or more generally per ongoing network stream 211-213 (for example, MMoIP, Chat, video streaming, browsing, mail, social networks). It is to be noted that the threshold estimator 22 may further offer the user the ability to specify the threshold values.

Figure 3:
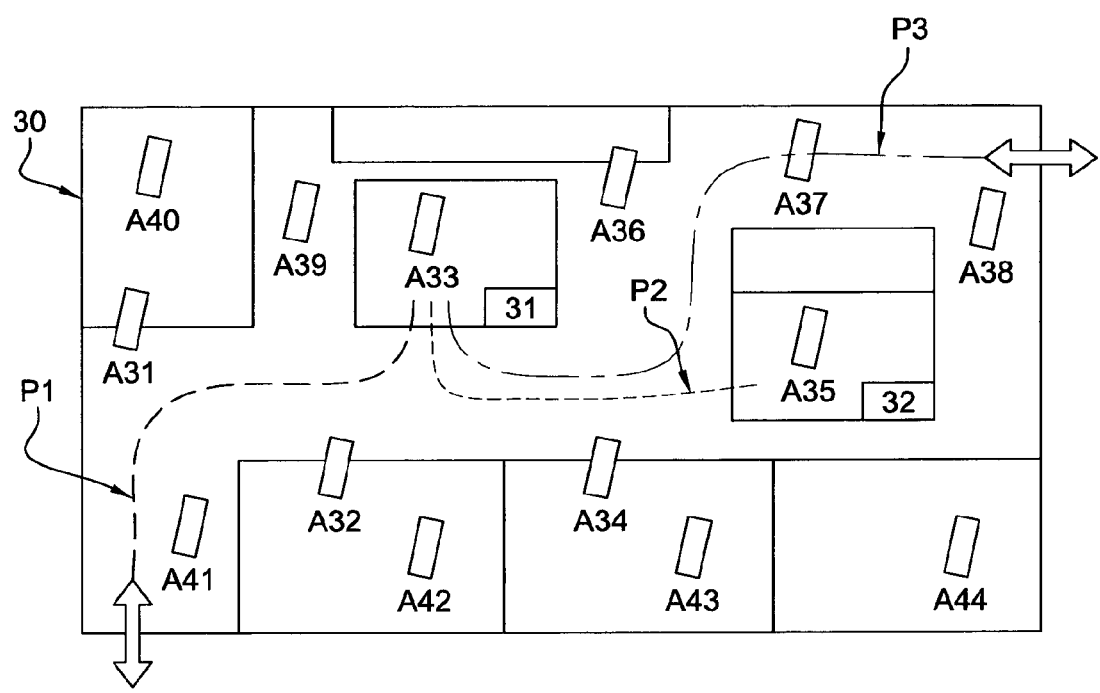
FIG. 3 is a schematic diagram illustrating an implementation of various embodiments in a representative environment.

With reference now to FIG. 3, an illustrative embodiment of the above disclosure is presented for teaching how the risk and threshold could be calculated and how disconnection-sensitive applications can be handled.

In the example of FIG. 3, the environment is a building 30 comprising a plurality of WiFi access point A31-A44.

A user enters the building 30 and walks along the path P1 (the dashed line) to his office 31 where he starts working: his mobile device is automatically associated to A41 as soon as it is under the radio coverage of A41. The WiFi connectivity manager records a new path P1 starting with root access point A41 (changing the mobile device from a disconnected state to a connected state). This WiFi access point A41 is identified in the path P1 with its BSSID (Basic Service Set ID). Subsequently, a timer is armed as soon as the WiFi connectivity is established for measuring the duration of this association. The user walks to his office 31. The mobile device maintains a WiFi connection, successively, through the access points A31, A32 and A33 according to handover known process. When the smartphone looses A41 association to establish a better connectivity through A31, A31 is appended to the path initialized above with A41 association. The timer is stopped and the value D1_31 corresponding to the delay necessary to reach A31 is stored within the path (i.e. the association duration to A41). The WiFi connectivity manager knows now that it takes around D1_31 to go from A41 to A31 when taking path P1. When the user is in his office 31, the path P1 is made of A41-A31-A32-A33 with delays [D1_31, D1_32, D1_33].

After having checked his e-mail during a certain time period (for example, 1 hour or two), the user goes from his office 31 to a meeting room 32. This creates the path P2 (the dotted line) made of access points A33-A34-A35 with delays [D2_34, D2_35]. As the time period of connection to the WiFi access point A33 is quite long (i.e. several hours), A33 is considered as a "safe place". The reverse path P2r (namely, from the meeting room 32 to the office 31) is automatically created. P2r is A35-A34-A33 with corresponding delays [D2_35, D2_34].

The path P2 (respectively, P2r) may be the continuity of the path P1 (respectively, P2) resulting in a single path, or a new path originated from the "safe place" covered by A33 (respectively, A35).

For instance, after a 2 hours meeting, the user comes back to his office 31. This does not create a new path as the access points which ensure WiFi connectivity between the meeting room 32 and the office 31 are the same A35-A34-A33. The delay between A34 and A33 is used to update D2_34 as this new value corresponds really to the time necessary to walk from A34 to A33 whereas the first value corresponded to the time elapsed between the moment at which the user arrived in his office 31 and the moment at which he left his office 31. For the same reason, the delay D2_35 measured at step2 is updated with the new value which corresponds roughly to the meeting duration. But this long value indicates that A35 may be considered as a "safe place".

The user leaves the building 30, to go for lunch, through the exit under the WiFi access point A38 radio coverage (the dashed-and-dotted line). This creates a new path P3 A33-A34-A35-A36-A37-A38 with the corresponding delays [D3_34, D3_35, D3_36, D3_37, D3_38, D3_38loss]. The new delay D3_35 measured between A34 and A35 (i.e. the association duration to A34) is compared with D2_35 and both paths are updated with mean delay if the new value is neither significantly lower nor greater than the previous one. D3_34 is the delay measured in path P2, namely D2_34. The last delay D3_38loss is the delay measured between the time at which the mobile device associated to the dead-end access point A38 and the time at which the WiFi connection is lost. The reverse path P3r is automatically created: P3r=A38-A37-A36-A35-A34-A33 with delays [D3_38,D3_37, D3_36,D3_35,D3_34]. When the WiFi connectivity with A38 is lost, this access point is considered as a dead-end access point. The time of the day at which this connectivity is lost (namely, the duration of the association to A38) is registered by the WiFi connectivity manager. This may be used to weight the risk based on user habits.

The user comes back from lunch. He enters the building 30 through the same door and walks along path P3 to his office 31. Delays between A38 and A37, A37 and A36, A36 and A35, A35 and A34, A34 and A33 are updated according to the same algorithm as above: If the new value is significantly greater than the previous one, it is not taken into account. If the new value is significantly lower than the previous one, it replaces it. Otherwise, the new value is the mean of the previous one and the current one.

As illustrative example of the risk computation, the user is in communication with a client but has to go to the railway station to catch a train. At the very beginning of this use case, the user is sat in his office 31. The call is a video session and has been established in SIP over the WiFi connection offered by the WiFi access point A33.

At that time there are 3 paths P1r (reverse path of P1), P2, and P3 that the user can follow.

In one embodiment, the risk for each of these paths is calculated as follows:
- the risk R1r when following P1r is given by 1/(D1_41 loss+D1_33+D1_32+D1_31). D1_41loss is null in this case as it is not yet experienced connectivity loss when connected to A41. Here, D1_31 includes D1_41loss;
- the risk R2 when following P2 is null as there is no dead-end access point at the end of P2. Then R2 is equal to 0;
- the risk R3 when following P3 is given by 1/(D3_38loss+ D3_37+D3_36+D3_35+D3_34).

These three values are compared to a threshold which is calculated based on current running connection-based application 211-213. Accordingly, these thresholds take into account the characteristics of the ongoing steams. In fact, the QoS required for each stream has an impact on handover threshold. Real-time streams require early and quick handover to avoid data loss while other streams such as browsing are disconnection-tolerant. For instance, the threshold T may be approximate to 1/D_video_Handover where D_video_Handover is the delay necessary to switch the current video session from the WiFi network to the cellular data network (D_video_Handover is about 1 second for instance).

In one embodiment, initial values or default values of these thresholds per application type are chosen so that all risks are below these initial threshold values.

At first step, when the user moves toward the building exit and the mobile device is associated to the WiFi access point A32, an instantaneous path Pi=A3-A2 and an associated delay Di_32 representing the speed at which the user is moving are created. As this instantaneous path Pi is only comprised in P1r among all history paths (i.e. P1, P1r, P2, P2r, P3, P3r), then this path P1r is the most probable to be followed.

At second step, the new risk is now R1r=1/(D1_41loss+ D1_32+D1_31) and is compared to the threshold T relative to the ongoing network stream (for example, the stream of a video). T has not changed as the video call is still running on the mobile device. The measured Di_31 may be compared with D1_32 to estimate if the user is moving faster or slower than the mean values previously calculated, improving by the way the accuracy of the risk R1r.

At third step, the mobile device is associated to WiFi access point A31. According to path P1 topology, there is only one access point left before the WiFi connectivity is lost. The risk, when associated to the access point A31, is R1r=1/(D1_41loss+D1_31) which grows rapidly. Consequently, when the mobile device is associated to WiFi access point A31, the WiFi connectivity manager starts a timer which measures the delay Di_a since this association. The risk is now calculated according to the following formula: R1r=1/(D1_41loss+(D1_31−Di_a)).

At forth step, when the current risk becomes greater or equal to the threshold T, the WiFi connectivity manager triggers a handover of the disconnection-sensitive application 211-213 (such as a video call) over a cellular data network. This may happen either while the terminal is still connected through the WiFi access point A31 or when connected to the dead-end WiFi access point A41 (when associated to A41, R1r is first calculated using formula of the third step and a timer is started at A41 association to measure D1_41loss for P1r calculation update).

Alternatively, the risk levels may be configured by the user, depending on locations within the environment.

In one embodiment, the information related to the mobile device movements within the environment 10 is correlated to location based and "movement-based" applications and not only handover. A "movement based" application is an application which does not only rely on the user location but also on the direction is walking in and the speed he uses for that.

Advantageously, the above-described method and system enable secured determination of triggering point for handover, preventing any multimedia communication loss (i.e. triggering handover of multimedia streams before losing these streams) and ensuring multimedia sessions continuity (being of particular interest to multimedia application providers). Further, the proposed system ensures accurate handover decisions as it takes into account the characteristics of ongoing applications (disconnections-sensitive or -tolerant).

It is to be noted that the above described method and system may be applied for any other wireless LAN standard, in the same way as for the WiFi.

The invention claimed is:

1. A method for anticipating the loss of connectivity between a mobile device and a wireless short-range access point among a plurality of such wireless access points, the method comprising:
   collecting identifiers of access points to which the mobile device was successively associated without loss of connectivity and the duration of each of these associations so that reproducing a plurality of paths corresponding to the mobile device movements within the coverage areas of the access points to which the said mobile device was successively associated without loss of connectivity, each path comprising a root access point at which a connectivity is originated and a dead-end access point at which the connectivity is lost;
   detecting a current access point to which the mobile device is currently associated;
   identifying the paths comprising the current access point;
   computing risks of losing the connectivity when following each of the identified paths from the current access point to the root access point or to the dead-end access point of each of the identified paths, the risk of losing connectivity when following a path from a first access point to a second access point being the inverse of the sum of the collected durations of association corresponding to the access points comprised in the path from the first access point to the second access point; and triggering a handover based on a computed risk of the computed risks.

2. The method of claim 1, further comprising:

identification of at least an application in the mobile device using the connectivity provided by the access point to which the mobile device is currently associated;

determining of a threshold value above which, for the identified application, the connectivity is considered lost;

when a computed risk is greater than the determined threshold value, triggering of a handover of the identified application.

3. The method of claim 2, wherein the threshold value is the time required to handover the connection used by the identified application to another wireless short-range access point.

4. The method of claim 2, wherein the threshold value is the time required to handover the connection used by the identified application to a long-range communication network.

5. The method of claim 1, wherein the computed risks are weighted by predefined parameters.

6. A system for anticipating the loss of connectivity between a mobile device and a wireless short-range access point among a plurality of such wireless access points, the system comprising:

a collector configured to collect identifiers of access points to which the mobile device was successively associated without loss of connectivity and the duration of each of these associations so that reproducing a plurality of paths corresponding to the mobile device movements within the coverage areas of the access points to which the mobile device was successively associated without loss of connectivity, each path comprising a root access point at which a connectivity is originated and a dead-end access point at which the connectivity is lost;

a detector configured to detect a current access point to which the mobile device is currently associated;

an identifier configured to identify the paths comprising the current access point;

a risk calculator configured to compute risks of losing the connectivity when following each of the identified paths from the current access point to the root access point or to the dead-end access point of each of the said identified paths, the risk of losing connectivity when following a path from a first access point to a second access point being the inverse of the sum of the collected durations of association corresponding to the access points comprised in the path from the said first access point to the second access point; and a trigger configured to trigger a handover based on a computed risk of the computer risks.

7. The system of claim 6, further comprising:

an application identifier configured to identify at least an application in the mobile device using the connectivity provided by the access point to which the mobile device is currently associated;

a determiner configured to determine a threshold value above which, for the identified application, the connectivity is considered lost;

a trigger configured to trigger a handover of the identified application when a computed risk is greater than the determined threshold value.

8. The system of claim 7, wherein the identified application is a disconnection-sensitive application.

9. The system of claim 6, wherein the paths are obtained from a site map.

10. The system of claim 6, wherein the wireless short-range access point is a WiFi access point.

11. A non-transitory computer-readable medium including computer-readable instructions, which when executed by a processor, cause the processor to perform the method according to claim 1.

* * * * *